(12) United States Patent
Haddad et al.

(10) Patent No.: US 9,743,334 B2
(45) Date of Patent: Aug. 22, 2017

(54) METHOD AND APPARATUS FOR ENABLING DATA PATH SELECTION IN A VIRTUAL HOME GATEWAY

(71) Applicant: TELEFONAKTIEBOLAGET L M ERICSSON (PUBL), Stockholm (SE)

(72) Inventors: Wassim Haddad, San Jose, CA (US); Joel Halpern, Leesburg, VA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 365 days.

(21) Appl. No.: 13/866,320

(22) Filed: Apr. 19, 2013

(65) Prior Publication Data

US 2014/0226642 A1    Aug. 14, 2014

Related U.S. Application Data

(60) Provisional application No. 61/763,120, filed on Feb. 11, 2013.

(51) Int. Cl.
*H04L 12/701* (2013.01)
*H04W 40/02* (2009.01)
(Continued)

(52) U.S. Cl.
CPC .......... *H04W 40/02* (2013.01); *H04W 40/12* (2013.01); *H04W 40/20* (2013.01);
(Continued)

(58) Field of Classification Search
None
See application file for complete search history.

(56) References Cited

U.S. PATENT DOCUMENTS

| 8,682,358 B1* | 3/2014 | Shah | G08C 17/00 370/311 |
|---|---|---|---|
| 2010/0113015 A1* | 5/2010 | Casati | H04W 60/04 455/432.1 |

(Continued)

OTHER PUBLICATIONS

"TR-203 Interworking between Next Generation Fixed and 3GPP Wireless Networks", Aug. 1, 2012 (Aug. 1, 2012), XP055116283, Retrieved from the Internet: URL:http://www. broadband-forum. org/technical/download/TR-203.pdf [retrieved on May 5, 2014], paragraph [04.8], paragraph [06.1], paragraph [appendixII.], figures 1,2,8,9,23.

(Continued)

*Primary Examiner* — Hicham Foud
*Assistant Examiner* — Ayanah George (57) ABSTRACT

Embodiments of the present disclosure include methods and apparatuses for enabling data path selection. In an EPG, ILNP mobility signaling is received. The ILNP signaling may include a destination locator for a BNG. A signaling message is sent to the BNG in response to the received ILNP signaling. An acknowledgement is received from the BNG. Traffic is tunneled between a mobile device and a RGW over a LTE interface.
In a BNG, a signaling message is received. A message is sent to a SDN controller. A notification is received from the SDN controller that configuration of a RGW to tunnel traffic over a LTE interface is complete. An acknowledgement is sent to an EPG. In a RGW, a message is received from a SDN controller. Traffic is tunneled between a NAS and an EPG over a LTE interface based on the message received from the SDN controller.

25 Claims, 9 Drawing Sheets

(51) Int. Cl.
*H04W 40/20* (2009.01)
*H04W 76/02* (2009.01)
*H04W 40/12* (2009.01)
*H04L 12/707* (2013.01)
*H04L 12/24* (2006.01)
*H04L 29/12* (2006.01)

(52) U.S. Cl.
CPC ........... *H04W 76/022* (2013.01); *H04L 41/12* (2013.01); *H04L 45/00* (2013.01); *H04L 45/22* (2013.01); *H04L 61/2076* (2013.01); *H04L 61/6059* (2013.01)

(56) References Cited

U.S. PATENT DOCUMENTS

| | | | |
|---|---|---|---|
| 2010/0189052 A1* | 7/2010 | Kavanagh | H04L 29/12915 370/329 |
| 2010/0202455 A1* | 8/2010 | Sundaram | H04W 8/082 370/392 |
| 2010/0208742 A1* | 8/2010 | Kafle | H04L 29/12066 370/401 |
| 2011/0007711 A1* | 1/2011 | Muhanna | H04W 36/0011 370/331 |
| 2011/0103260 A1* | 5/2011 | Jeyatharan et al. | 370/254 |
| 2011/0141884 A1* | 6/2011 | Olsson | H04W 24/04 370/225 |
| 2011/0170531 A1* | 7/2011 | Ng | H04W 8/26 370/338 |
| 2012/0020284 A1* | 1/2012 | Haddad | H04L 29/06 370/328 |
| 2012/0044908 A1* | 2/2012 | Spinelli | H04W 92/02 370/331 |
| 2012/0082161 A1* | 4/2012 | Leung | H04L 12/4633 370/392 |
| 2012/0230191 A1* | 9/2012 | Fang | H04W 36/22 370/235 |
| 2012/0320736 A1* | 12/2012 | Hillier | H04M 3/2263 370/218 |
| 2013/0265997 A1* | 10/2013 | Gu | H04W 36/0022 370/338 |

OTHER PUBLICATIONS

Kafle V. Petal.: "An ID/locator split architecture of future networks", Innovations for Digital Inclusions, 2009. K-IDI 2009. ITU-T Kaleidoscope:, IEEE, Piscataway. NJ, USA. Aug. 31, 2009 (Aug. 31, 2009), pp. 1-8, XP031570213, ISBN: 978-92-61-12891-3, paragraphs [05.2], [05.3], [006.].

Atkinson, R. et al. "Identifier-Locator Network Protocol (ILNP) Engineering Considerations", RFC 6741, pp. 1-38, Nov. 2012.

"Virtual Home Gateway", Sep. 1, 2011 (Sep. 1, 2011), pp. 1-86, XP055038003, Retrieved from the Internet: URL:http://archive.eurescom.eu/-pub/deliverables/documents/P200 -series/P2055/01/P2055-01.pdf, [retrieved on Sep. 12, 2012].

Kempf J. et al.: "Moving the Mobile Evolved Packet Core to the Cloud", 2012 5th International Workshop on Selected Topics in Mobile and Wireless Computing, Oct. 10, 2012 (Oct. 10, 2012), DOI: 10.1109/WiMOB.2012.6379165, ISBN: 978-1-4673-1429-9 Retrieved from the Internet: URL:http://ieeexplore.ieee.org/xpls/abs_all.jsp?arnumber=6379165&tag=1, [retrieved on Aug. 27, 2014].

* cited by examiner

METHOD AND APPARATUS FOR ENABLING DATA PATH SELECTION IN A VIRTUAL HOME GATEWAY

CROSS-REFERENCES TO RELATED APPLICATIONS

This application claims priority to U.S. Provisional Application Ser. No. 61/763,120, filed on Feb. 11, 2013, the entire disclosure of which is hereby incorporated herein by reference in its entirety.

FIELD

The present disclosure relates to seamless flow mobility. More particularly, the present disclosure relates to seamless flow mobility in the context of a virtual home gateway.

BACKGROUND

The virtual Home Gateway (vHGW) removes most of the intelligence from the residential GW (RGW) and places this intelligence into the operator's infrastructure (e.g., Border Network Gateway (BNG), cloud). Doing this provides operators with better control over the RGW configuration in order to enable innovative services. In a basic vHGW deployment, the RGW is turned into a bridge running Software Defined Networking (SDN) components.

Among its key features, the vHGW connects the bridge to the Long Term Evolution (LTE) network. The interface between the vHGW and the LTE network is called an LTE backup channel (LBC). The LBC was originally designed to be used in case of uplink and/or vHGW node failure(s). The vHGW enables the LBC to inter-connect home devices as well as connecting them to the Internet by restoring the same network configurations as those implemented prior to the uplink and/or vHGW failure.

LTE and Wireless Local Area Network (WLAN) interfaces are increasingly common on user's mobile devices (e.g., laptop, tablet, smartphone, etc). When at home, these devices would normally switch to WLAN (i.e., due to higher throughput, better coverage and lower battery power consumption). However, when these devices move outside of the WLAN umbrella, they need to switch to LTE in order to keep ongoing sessions alive.

It is important to mention that when one endpoint switches from a WLAN to a LTE network, the path to reach the other endpoint will change since LTE requires all data packets sent and/or received by the LTE interface to go through an Evolved Packet Gateway (EPG) node. It is also important to note that EPG and BNG(s) are infrastructure nodes that can be located far away from each other. When EPGs and BNGs are located far away from each, other possible effects of latency can degrade a user's perceived quality of experience.

What is needed, therefore, is a way to improve (or at least maintain) a user's quality of experience (QoE) when one endpoint switches to LTE (e.g., the user moves the device outside of the home WLAN umbrella) while communicating with another device located in another home WLAN network.

SUMMARY

The present disclosure describes seamless flow mobility in the context of a virtual home gateway where all intelligence is concentrated in the operator's fixed and mobile networks and there is an LTE interface attached to the home Customer Premise Equipment (CPE).

The present disclosure allows operators to move a flow from a fixed network to a mobile network when one device is always attached to the fixed side and is not capable of connecting to a LTE network and another device is capable of switching from a WLAN to LTE. The session, e.g., flow, is kept on an optimal path in order to prevent harming the user's QoE.

A method and apparatus for enabling data path selection in a virtual home gateway is disclosed. In one embodiment, Identifier Locator Network Protocol (ILNP) mobility signaling is received from a mobile device. The ILNP mobility signaling may include a destination locator for a Border Network Gateway (BNG). A signaling message is sent to the BNG in response to the received ILNP mobility signaling. An acknowledgement message is received from the BNG. Traffic is tunneled between the mobile device and a residential gateway (RGW) over a Long Term Evolution (LTE) interface.

The signaling message includes a request to re-configure the RGW serving the destination locator. The signaling message comprises a Flow Offload Request (FOR).

In one embodiment, a Flow Offload Denial (FOD) is received from the BNG when the FOR cannot be completed. The FOD includes flow parameters and a nonce.

The FOR includes flow parameters and a nonce. The flow parameters may include, but are not limited to, at least one port number, at least one locator, and at least one tunnel parameter.

In one embodiment, the acknowledgement message from the BNG includes flow parameters and a nonce.

In one embodiment, a mapping between a prefix of the LTE interface of the RGW and at least one home network locator for a user that is advertised by the BNG is determined. An associated Software Defined Networking (SDN) controller is used to update a configuration of the RGW over the LTE interface.

In one embodiment, a signaling message is received from the BNG. In response to the signaling message from the BNG, a binding between a destination locator of the mobile device and an Internet Protocol version 6 (IPv6) address of a network attached storage element is stored in a cache memory. An acknowledgement is sent to the BNG.

The signaling message from the BNG can be a Destination Prefix Update (DPU). The acknowledgement sent to the BNG can be a Destination Prefix Acknowledgement (DPA).

In one embodiment, parameters used to tunnel the traffic over the LTE interface are added to the stored binding. An ILNP-proxy entity is used to tunnel the traffic between the mobile device and the RGW.

A method and apparatus for enabling data path selection in a virtual home gateway is disclosed. In one embodiment, a signaling message is received from an Evolved Packet Gateway (EPG). A message that includes flow parameters is sent to a Software Defined Networking (SDN) controller. A notification is received from the SDN controller that configuration of a residential gateway (RGW) to tunnel traffic over a LTE interface is complete. An acknowledgement message is sent to the EPG.

The message sent to the SDN controller can be a Flow Offload Request (FOR) message.

In one embodiment, a BNG runs an Identifier Locator Network Protocol (ILNP) proxy entity. A signaling message is sent to the EPG. An acknowledgement is received from the EPG. The message sent to the SDN controller is a request that carries flow parameters as processed by a network attached storage element associated with the RGW.

A method and apparatus for enabling data path selection in a virtual home gateway is disclosed. In one embodiment, a message is received from a Software Defined Networking (SDN) controller. Traffic is tunneled between a network attached storage element and an Evolved Packet Gateway (EPG) over a Long Term Evolution (LTE) interface based on the message received from the SDN controller.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, tablets, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

Figure 1:
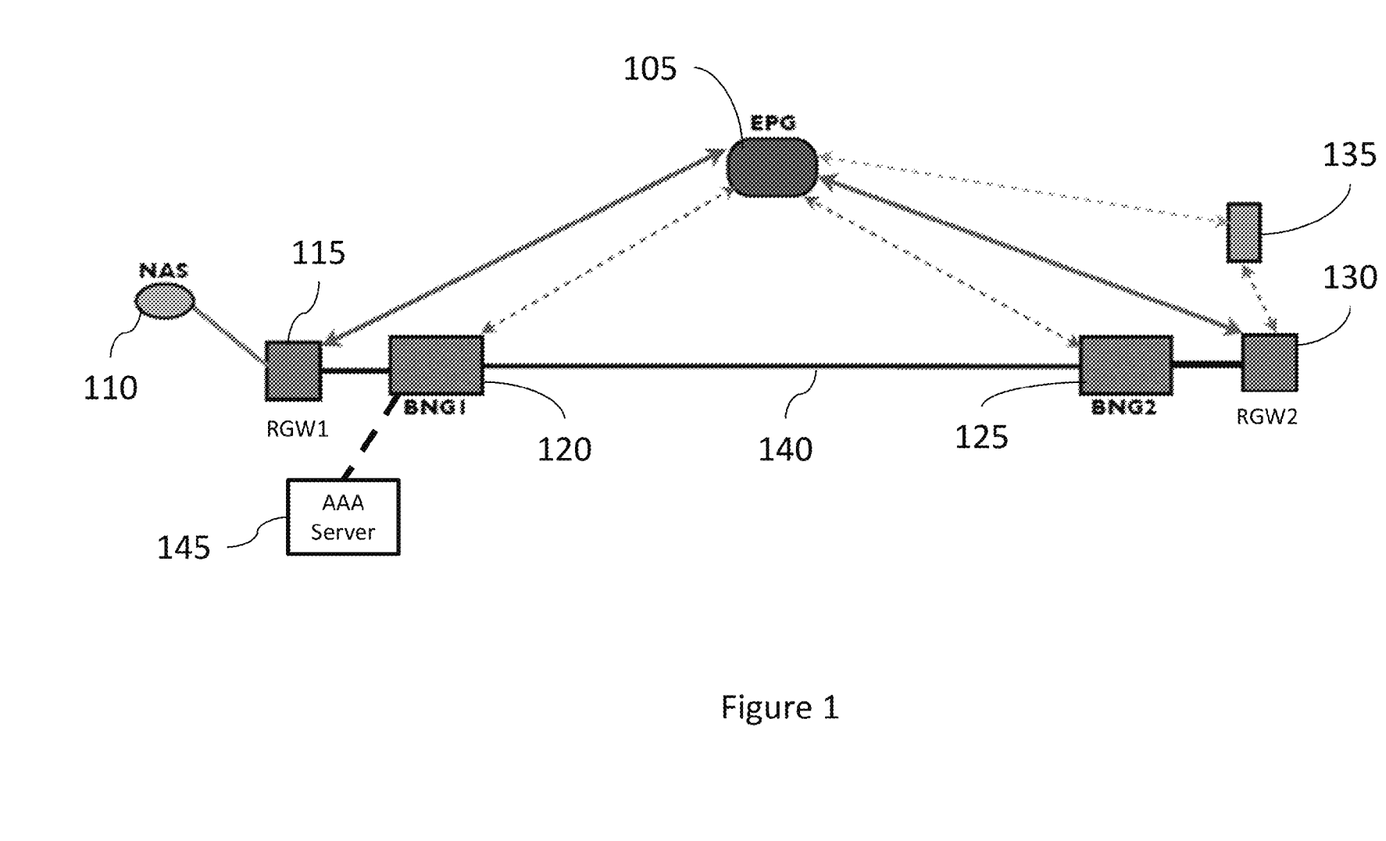
FIG. 1 is an illustration of a block diagram of a network for routing data according to one embodiment.

FIG. 1 illustrates a block diagram of a network for routing data according to one embodiment. FIG. 1 includes an Evolved Packet Gateway (EPG) 105, network attached storage (NAS) 110, RGWs 115, 130, BNGs 120, 125, and a mobile device, e.g., tablet 135. In this example, a first user, user 1, and a second user, user 2, live in two separate houses that are connected to two different BNGs. User 1 is connected to BNG 120 using RGW 115. User 2 is connected to BNG 125 using RGW 130. BNGs 120, 125 are cable of routing data to/from each other over the Internet 140.

In this example, both users are connected to the same EPG 105 through RGWs 115, 130. It is not uncommon for two users to be connected to the same EPG due to the EPG having a higher capacity when compared with the BNG. When user 1 streams a high definition (HD) video from NAS 110 to tablet 135, which is connected to user 2's home WLAN, e.g., RGW 130, the data traffic goes through BNGs 120, 125 and is expected to be routed on an optimal data path, e.g., over the Internet 140.

When user 2 moves mobile device 135 outside of the home WLAN coverage, the mobile device 135 switches from user 2's RGW 130 to the LTE network. Traffic for user 2's mobile device now travels through the EPG 105, which can be located far away from user 2's BNG 130. In current practice, the traffic will travel through both BNGs 120, 125, then through EPG 105 before reaching mobile device 135. This new path is sub-optimal and may incur a high latency that would severely affect the quality of the HD streaming.

Since the operator is capable of tracking user 2's tablet 135, the present disclosure enhances operator capabilities by allowing the operator to modify, in real-time, the data path between the NAS 110 and the new topological location of the mobile device 135, the new topological location being the connection of mobile device 135 to EPG 105 instead of RGW 130. The present disclosure keeps the data transfer session running with minimum disturbance and similar or better QoE while being completely transparent to both users.

Figure 2:
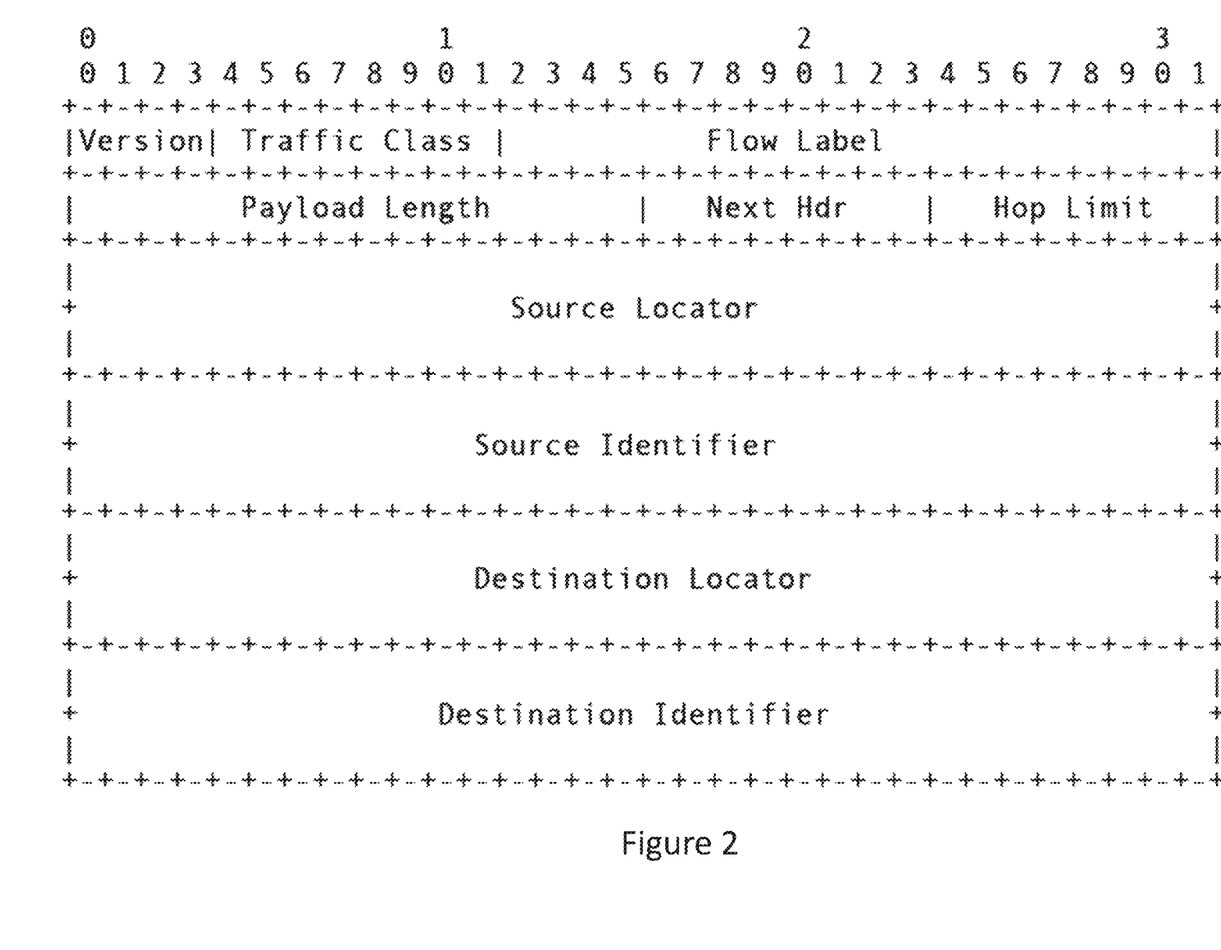
FIG. 2 is an illustration of an Identifier Locator Network Protocol version 6 (ILNPv6) packet header.

Identifier Locator Network Protocol (ILNP) can be used to modify, in real-time, the data path between the NAS 110 and the new topological location of the mobile device 135. When ILNP is used, switching the data, e.g., video, flow to an LTE path requires swapping the present locators with new locators that are "topologically correct." An example ILNP version 6 (ILNPv6) packet header is shown in FIG. 2. In this example, the following parameters are included in the ILNP packet header: version, traffic class, flow label, payload length, next header, hop limit, source locator, source identifier, destination locator, and destination identifier.

Using the new topologically correct locators avoids unnecessary tunneling (especially over the LTE air interface). In addition, using ILNP provides the ability to break out the traffic from user 1's RGW 115 (instead of breaking out the traffic from BNG 125), which is the most optimal path.

ILNP can be used in two scenarios. The first scenario is where both endpoints, i.e., NAS 110 and mobile device 135, are ILNP-enabled. The second scenario is where mobile device 135 is ILNP-enabled and NAS 110 is running Internet Protocol version 6 (IPv6).

When both endpoints are ILNP-enabled, any locator change on one side is communicated to the other side using dedicated ILNP mobility signaling messages. In this scenario, when NAS 110 is updated with a new locator, NAS 110 starts using the new locator advertised to mobile device 135 over the LTE interface. Subsequent data packets sent from the NAS will follow one of two (sub-optimal) paths: 1) NAS<-->BNG1<-->EPG<-->Mobile Device; or 2) NAS<-->BNG1<-->BNG2<-->EPG<-->Mobile Device.

Data traffic, e.g., video traffic, can be forwarded on a more optimal path by sending traffic to the EPG as early as possible without having to go through any BNGs. Using this more optimal path, the selected path would be: NAS<=>EPG<-->Mobile Device. In order to achieve this optimal path, user 1's RGW 115 programmability and SDN components are exploited. In one embodiment, depending upon the relative rates, cell load, caps and prices, user 1 may be able to control the path selection procedure and decide to keep the traffic going through BNG 120.

Figure 3:
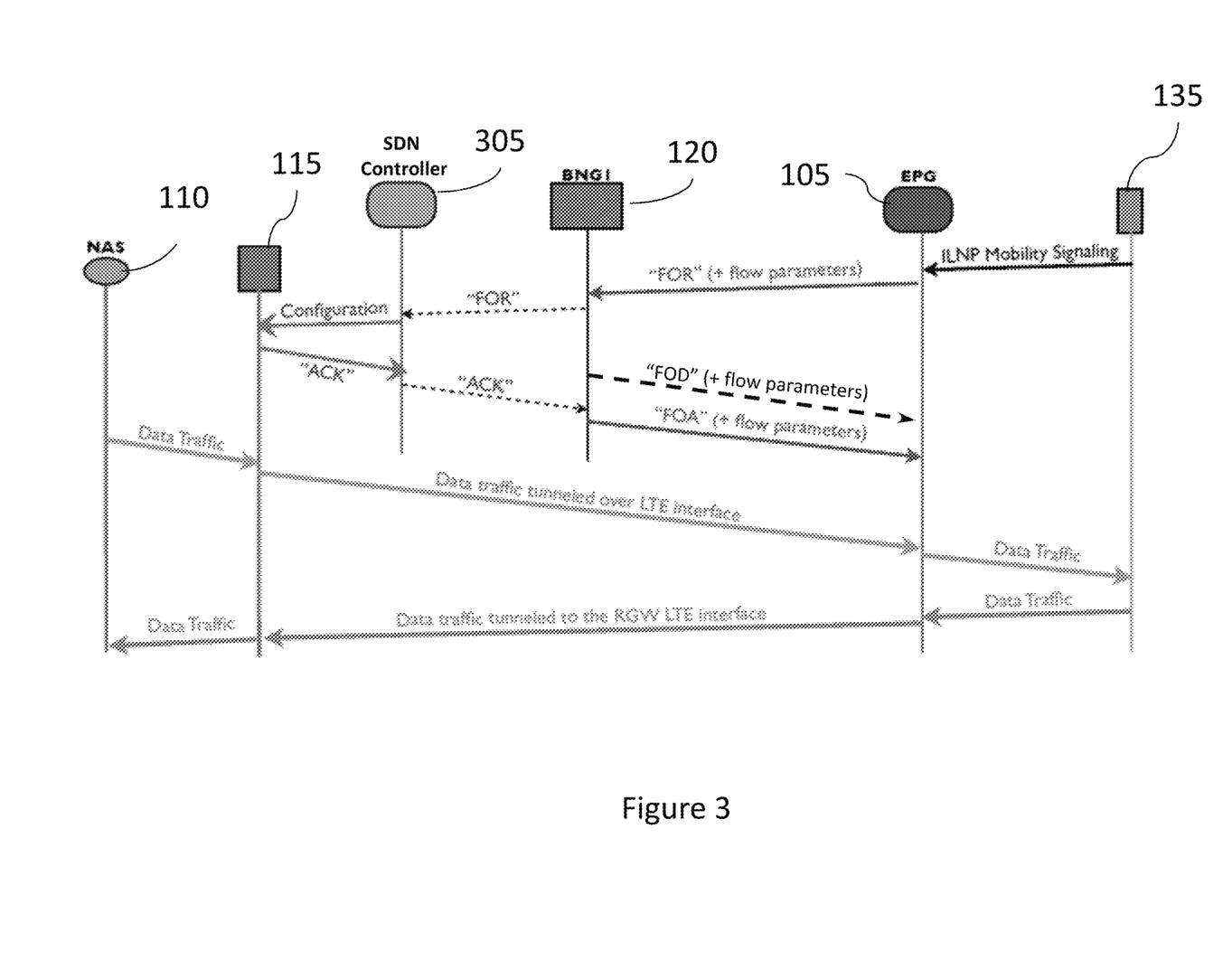
FIG. 3 is an illustration of a system for enabling data path selection in a vHGW, according to one embodiment.

FIG. 3 illustrates a diagram of a system for enabling data path selection in a vHGW, according to one embodiment. In this embodiment, both endpoints are ILNP-enabled. When receiving ILNP mobility signaling with a destination locator advertised by a known BNG 120, the EPG 105 sends a signaling message to the BNG 120 carrying a request to re-configure the RGW 115 serving the destination locator with a 5-tuple associated with the video stream so that the RGW 115 can re-route the video traffic over the LTE interface. The signaling message sent by EPG 105 to BNG 120 is called a "Flow Offload Request (FOR). The FOR carries flow parameters and a nonce (N). The FOR message is then forwarded by BNG 120 to a corresponding SDN controller 305. Using SDN protocols, e.g., Forwarding and Control Element Separation (ForCES), the SDN controller 305 sends a message to RGW 115 and creates a new entry in the routing table for RGW 115 with the flow parameters. The flow parameters include, but are not limited to, port numbers, locators, and tunnel parameters. The RGW 115 is configured to tunnel data packets sent from NAS 110 over the LTE interface, i.e., using the LBC to communicate with EPG 105. In one embodiment, the tunneling from the RGW over the LTE interface is pre-configured. In one embodiment, where the tunneling is pre-configured, the LTE interface with the RGW can be accomplished using a Universal Serial Bus (USB) attached to the bridge, e.g., the RGW.

The SDN controller 305 notifies the BNG 120 when configuration is complete. The BNG 120 replies to the EPG 105 with an acknowledgement message, e.g., a Flow Offload ACK (FOA) message. The FOA message carries the same parameters as the FOR message and includes a nonce (N).

In one embodiment, if the FOR message cannot be completed, a Flow Offload Denial (FOD) message should be sent by the BNG 120 to the EPG 105 since EPG 105 has to take appropriate actions depending on the success/failure of the request. Similarly, the FOD message carry the flow parameters and the nonce (N).

Upon receiving a FOA message, the EPG 105 stores the flow parameters in its cache so that the EPG 105 can tunnel the traffic sent from mobile device 135 to RGW 115. Likewise, EPG 105 tunnels traffic sent from RGW 115 to mobile device 135. In one embodiment, the locator of NAS 110 is not advertised by the EPG 105.

In one embodiment, the EPG 105 can learn the mapping between a prefix of the LTE interface of RGW 115 and the home network locator(s) for user 1 that are advertised by BNG 120. Knowing this mapping allows the EPG 105 to use its own SDN Controller to update the configuration of RGW 115 over the LTE interface.

In one embodiment, the LTE backup channel can be implemented as an add-on service, which allows for monetization by an operator of the network. When a client requests additional connectivity using the LTE backup channel, the LTE configuration is tightly associated to the client credentials as well as to the RGW parameters. Thus, in this situation the EPG is able to learn the prefix advertised to the home network over the fixed broadband (and do the mapping). In fact, the RGW needs to authenticate to the operator infrastructure, e.g., using an authentication, authorization, and accounting (AAA) server 145 coupled to BNG 120, prior to allowing any user traffic to go through. The AAA server 145 can store the RGW credentials (i.e., including all identifiers). The AAA server 145 can, in one embodiment, store the prefix that is advertised by the BNG 120. The EPG notifies the AAA server 145 about the prefix advertised to the RGW-LTE interface. The AAA server 145 can then do the mapping and send this mapping to the EPG 105.

Figure 4:
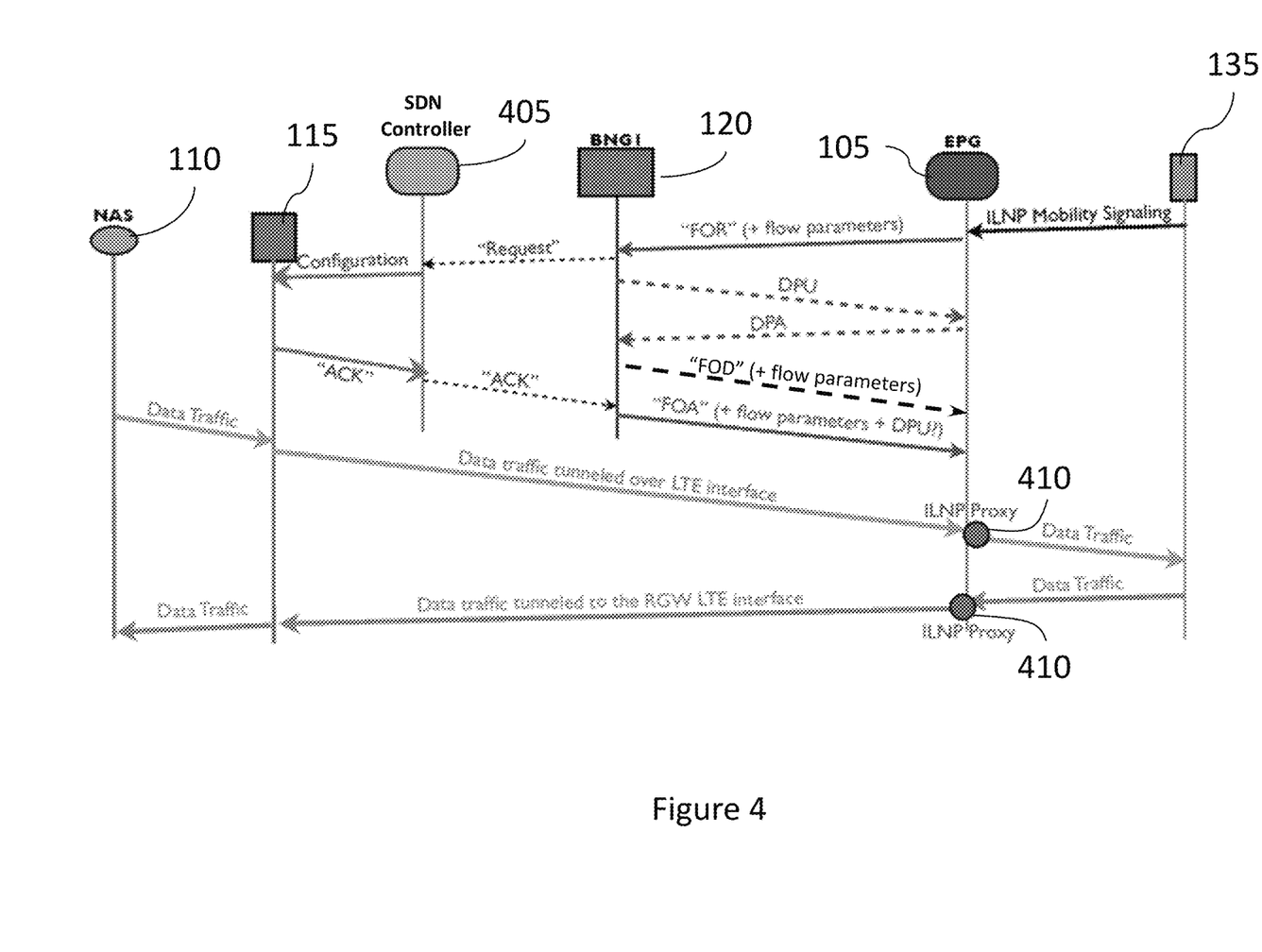
FIG. 4 is an illustration of a system for enabling data path selection in a vHGW, according to one embodiment.

FIG. 4 illustrates a system for enabling data path selection in a vHGW, according to one embodiment. In this embodiment, mobile device 135 is ILNP-enabled and NAS 110 is running Internet Protocol version 6 (IPv6) but does not have support for ILNP. ILNP-proxy entities running in BNGs are used to enable data path selection. BNG 120 runs a proxy-ILNP, which would process, for example, ILNP mobility signaling messages sent from mobile device 135.

Upon receiving ILNP mobility signaling from mobile device 135, the EPG 105 sends a FOR message to BNG 120. However, at this stage, in systems not employing the inventive concepts of the present disclosure, only the BNG 120 would be aware of the fact that the NAS is not ILNP-enabled and, therefore, cannot process ILNP signaling messages. It follows that the EPG 105 would not be able to tunnel data packets sent from mobile device 135 over the RGW 115 LTE interface as these data packets would be sent to the BNG 120 and not directly to the NAS 110 (the same limitation applies to data packets sent from the NAS 110, i.e., they cannot be tunneled directly over the RGW 115 LTE interface to mobile device 135).

In order to enable data path selection in this embodiment, additional parameters and signaling exchange are needed between different entities. Upon receiving ILNP mobility signaling with a destination locator advertised by a known BNG 120, the EPG 105 sends a FOR message with the 5-tuple associated with the video stream and a nonce (N).

Upon receiving the FOR message and being aware that the NAS 110 is not ILNP-enabled, the BNG 120 sends a request to the SDN controller 405, which carries the flow parameters as they are processed by the NAS 110. This means that the BNG 120 first updates the destination locator with the NAS 110 IPv6 address (assuming ports are the same). In addition to sending the request to the SDN controller 405, the BNG 120 sends a new signaling message to the EPG 105. The signaling message sent to EPG 105 notifies the EPG about the NAS 110 IPv6 address (and, optionally, the locator used to communicate through the WLAN interface). This notification is done by sending an Internet Control Message Protocol version 6 (ICMPv6) message called a Destination Prefix Update (DPU), which carries the destination locator used by mobile device 135 and the NAS 110 IPv6 address.

Using SDN protocols, e.g. ForCES, the SDN controller 405 sends a message to RGW 115 and creates a new entry in the routing table of RGW 115 with the flow parameters. The flow parameters include, but are not limited to, port numbers, IPv6 addresses, and tunnel parameters. In this embodiment, RGW 115 is configured to tunnel data packets sent from NAS 110 over the LTE interface. The SDN controller 405 notifies the BNG 120 when configuration is complete.

When receiving a DPU message, the EPG 105 stores in its cache memory the binding between the two parameters, i.e., the destination locator used by mobile device 135 and the IPv6 address of NAS 110. EPG 105 sends back a Destination Prefix ACK (DPA) message to the BNG 120. After receiving the DPA message, the BNG 120 can send back a FOA message to the EGP 105. In one embodiment, in the case of a failure, the BNG 120 sends a FOD message to the EPG 105. In this case, the EPG 105 should immediately remove the binding from its cache.

Upon receiving a valid FOA message, the EPG 105 adds to the cache entry already created, i.e., the stored binding created as a result of the DPU/DPA message exchange, the parameters to be used to tunnel data packets to the RGW 115 LTE interface. EPG 105 runs an ILNP proxy entity 410 in order to ensure that data packets sent to the NAS 110 carry the locator that was configured on RGW 130 since the NAS 110 is not aware of user 2's mobility. The same procedure is applied on all data packets sent from the NAS 110. In this case, the EPG 105 updates the destination locator with the current destination locator for user 2's mobile device 135.

In one embodiment, the DPU message can be embedded in the FOA message. In this case, no further response should be expected from the EPG 105.

Figure 5:
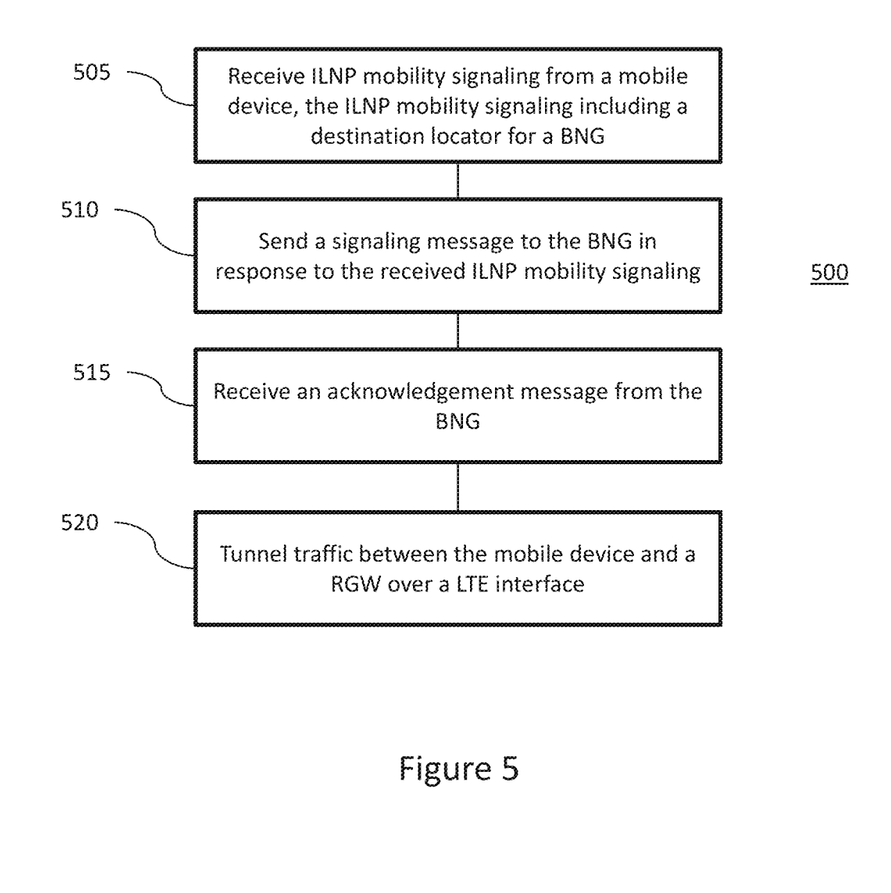
FIG. 5 illustrates a diagram of a method for enabling data path selection using an Evolved Packet Gateway, according to one embodiment.

FIG. 5 illustrates a diagram of a method for enabling data path selection, according to one embodiment. Method 500 illustrates an embodiment where both endpoints, e.g., NAS 110 and mobile device 135, are ILNP-enabled. At block 505, ILNP mobility signaling is received from a mobile device. In one embodiment, the ILNP mobility signaling includes a destination locator for a BNG. At block 510, a signaling message is sent to the BNG in response to the received ILNP mobility signaling. When receiving ILNP mobility signaling with a destination locator advertised by a known BNG 120, the EPG 105 sends a signaling message to the BNG 120 carrying a request to re-configure the RGW 115 serving the destination locator with a 5-tuple associated with the video stream so that the RGW 115 can re-route the video traffic over the LTE interface. The signaling message sent by EPG 105 to BNG 120 is called a "Flow Offload Request (FOR). The FOR carries flow parameters and a nonce (N).

In one embodiment, the EPG 105 can determine the mapping between a prefix of the LTE interface of RGW 115 and the home network locator(s) for user 1 that are advertised by BNG 120. Knowing this mapping allows the EPG 105 to use its own SDN Controller to update the configuration of RGW 115 over the LTE interface.

In one embodiment, if the FOR message cannot be completed, a Flow Offload Denial (FOD) message should be sent by the BNG 120 to the EPG 105 since EPG 105 has to take appropriate actions depending on the success/failure of the request. Similarly, the FOD message carries the flow parameters and the nonce (N).

At block 515, an acknowledgement message is received from the BNG. In one embodiment, the acknowledgement message is a FOA message. The FOA message carries the same parameters as the FOR message and includes a nonce (N).

Upon receiving a FOA message, the EPG 105 stores the flow parameters in its cache so that the EPG 105 can tunnel the traffic sent from mobile device 135 to RGW 115. Likewise, EPG 105 tunnels traffic sent from RGW 115 to mobile device 135. In one embodiment, the locator of NAS 110 is not advertised by the EPG 105.

At block 520, traffic is tunneled between the mobile device and a residential gateway (RGW) over a Long Term Evolution (LTE) interface.

Figure 6:
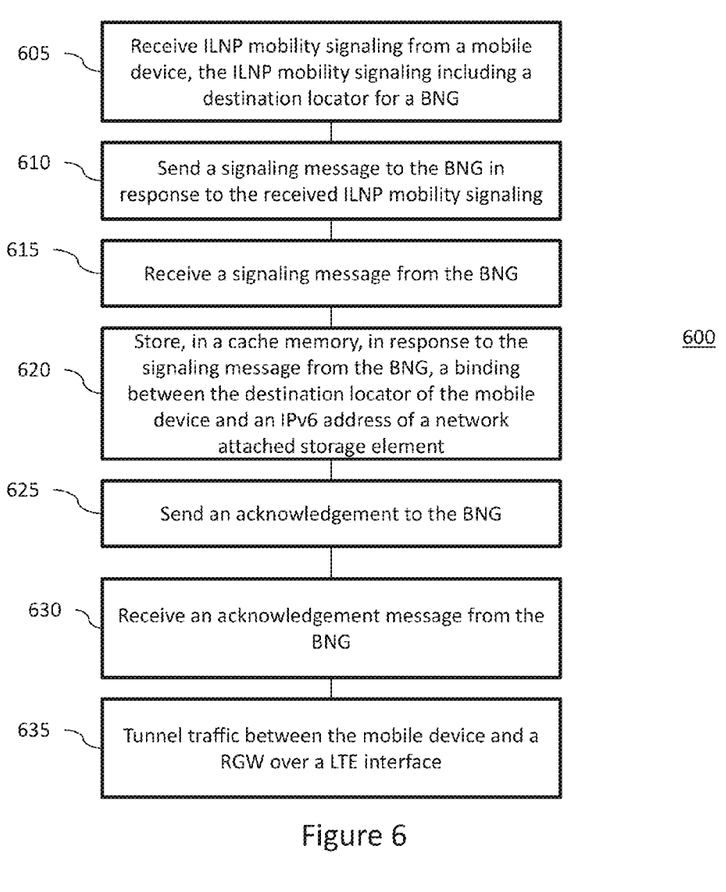
FIG. 6 illustrates a diagram of a method for enabling data path selection using an Evolved Packet Gateway, according to one embodiment.

FIG. 6 illustrates a diagram of a method for enabling data path selection, according to one embodiment. Method 600 illustrates an embodiment where only one endpoint, e.g., mobile device 135, is ILNP-enabled. NAS 110, in this embodiment, is running IPv6 but does not have support for ILNP.

At block 605, ILNP mobility signaling is received from a mobile device. In one embodiment, the ILNP mobility signaling includes a destination locator for a BNG. At block 610, a signaling message is sent to the BNG in response to the received ILNP mobility signaling. When receiving ILNP mobility signaling with a destination locator advertised by a known BNG 120, the EPG 105 sends a signaling message to the BNG 120 carrying a request to re-configure the RGW 115 serving the destination locator with a 5-tuple associated with the video stream so that the RGW 115 can re-route the video traffic over the LTE interface. The signaling message sent by EPG 105 to BNG 120 is called a "Flow Offload Request (FOR). The FOR carries flow parameters and a nonce (N).

At this stage, in systems not employing the inventive concepts of the present disclosure, only the BNG 120 would be aware of the fact that the NAS is not ILNP-enabled and, therefore, cannot process ILNP signaling messages. It follows that the EPG 105 would not be able to tunnel data packets sent from mobile device 135 over the RGW 115 LTE interface as these data packets would be sent to the BNG 120 and not directly to the NAS 110 (the same limitation applies to data packets sent from the NAS 110, i.e., they cannot be tunneled directly over the RGW 115 LTE interface to mobile device 135).

In order to enable data path selection in this embodiment, additional parameters and signaling exchange are needed between different entities. Upon receiving ILNP mobility signaling with a destination locator advertised by a known BNG 120, the EPG 105 sends a FOR message with the 5-tuple associated with the video stream and a nonce (N).

At block 615, a signaling message is received from the BNG 120. The signaling message received by EPG 105 notifies the EPG about the NAS 110 IPv6 address (and, optionally, the locator used to communicate through the WLAN interface). This notification is done by sending an Internet Control Message Protocol version 6 (ICMPv6) message called a Destination Prefix Update (DPU), which carries the destination locator used by mobile device 135 and the NAS 110 IPv6 address.

At block 620, a binding between the destination locator of the mobile device and an IPv6 address of a network attached storage element, e.g., NAS 110, is stored in a cache memory in response to the signaling message from the BNG. When receiving a DPU message, the EPG 105 stores in its cache memory the binding between the two parameters, i.e., the destination locator used by mobile device 135 and the IPv6 address of NAS 110.

At block 625, an acknowledgement is sent to the BNG. In one embodiment, the acknowledgement that the EPG 105 sends back to the BNG is a Destination Prefix ACK (DPA) message.

In one embodiment, if the FOR message cannot be completed, a Flow Offload Denial (FOD) message should be sent by the BNG 120 to the EPG 105 since EPG 105 has to take appropriate actions depending on the success/failure of the request. Similarly, the FOD message carries the flow parameters and the nonce (N).

At block 630, an acknowledgement message is received from the BNG. In one embodiment, the acknowledgement message is a FOA message. The FOA message carries the same parameters as the FOR message and includes a nonce (N). Upon receiving a valid FOA message, the EPG 105 adds to the cache entry already created, i.e., the stored binding created as a result of the DPU/DPA message exchange, the parameters to be used to tunnel data packets to the RGW 115 LTE interface. EPG 105 runs an ILNP proxy entity 410 in order to ensure that data packets sent to the NAS 110 carry the locator that was configured on RGW 130 since the NAS 110 is not aware of user 2's mobility. The same procedure is applied on all data packets sent from the NAS 110. In this case, the EPG 105 updates the destination locator with the current destination locator for user 2's mobile device 135.

In one embodiment, the DPU message can be embedded in the FOA message. In this case, no further response should be expected from the EPG 105.

At block 635, traffic is tunneled between the mobile device and a residential gateway (RGW) over a Long Term Evolution (LTE) interface.

Figure 7:
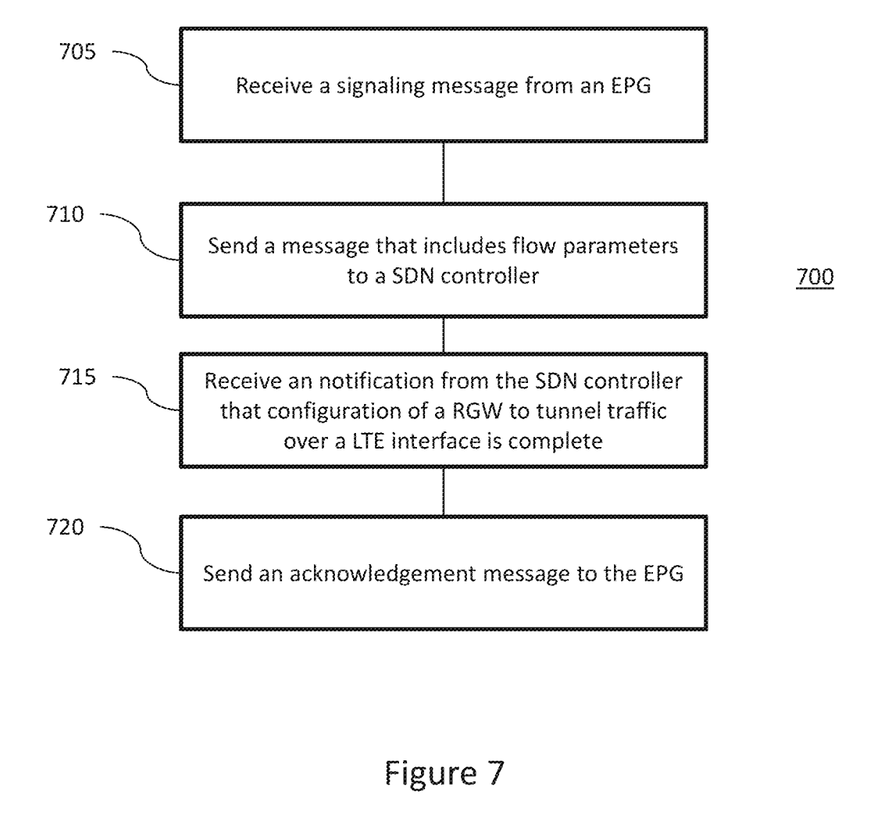
FIG. 7 illustrates a diagram of a method for enabling data path selection using a Border Network Gateway, according to one embodiment.

FIG. 7 illustrates a diagram of a method for enabling data path selection, according to one embodiment. Method 700 illustrates an embodiment where both endpoints, e.g., NAS 110 and mobile device 135, are ILNP-enabled. At block 705, a signaling message is received from an EPG at BNG 120. The signaling message received from the EPG carries a request to re-configure the RGW 115 serving the destination locator with a 5-tuple associated with traffic, e.g., a video stream, so that the RGW 115 can re-route the video traffic over the LTE interface. The signaling message received from the EPG 105 is called a "Flow Offload Request (FOR). The FOR carries flow parameters and a nonce (N).

At block 710, a message that includes flow parameters is sent from the BNG to a SDN controller. In this embodiment, the message is a FOR that is forwarded to the SDN controller.

At block 715, a notification is received from the SDN controller. The notification informs the BNG that a configuration of a RGW to tunnel traffic over a LTE interface is complete.

At block 720, and acknowledgement message is sent to the EPG. The BNG 120 replies to the EPG 105 with an acknowledgement message, e.g., a Flow Offload ACK (FOA) message. The FOA message carries the same parameters as the FOR message and includes a nonce (N).

In one embodiment, if the FOR message cannot be completed, a Flow Offload Denial (FOD) message should be sent by the BNG 120 to the EPG 105 since EPG 105 has to take appropriate actions depending on the success/failure of the request. Similarly, the FOD message carry the flow parameters and the nonce (N).

Figure 8:
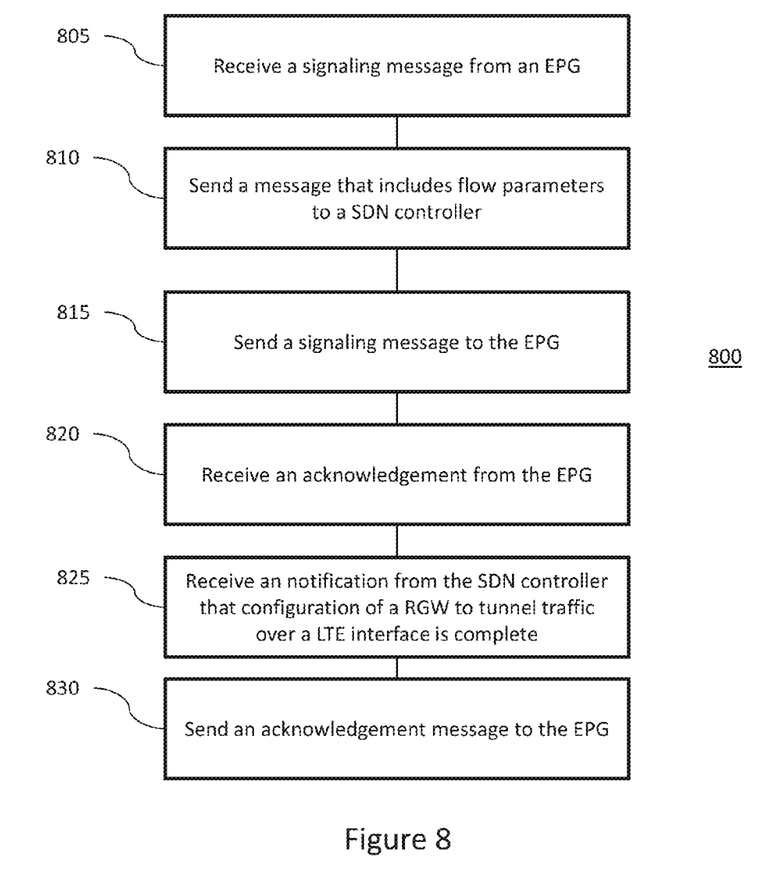
FIG. 8 illustrates a diagram of a method for enabling data path selection using a Border Network Gateway, according to one embodiment.

FIG. 8 illustrates a diagram of a method 800 for enabling data path selection, according to one embodiment. Method 800 illustrates an embodiment where only one endpoint, e.g., mobile device 135, is ILNP-enabled. NAS 110, in this embodiment, is running IPv6 but does not have support for ILNP. ILNP-proxy entities running in BNGs are used to enable data path selection. BNG 120 runs a proxy-ILNP, which would process, for example, ILNP mobility signaling messages sent from mobile device 135.

At block 805, a signaling message is received from an EPG at BNG 120. The signaling message received from the EPG carries a request to re-configure the RGW 115 serving the destination locator with a 5-tuple associated with traffic, e.g., a video stream, so that the RGW 115 can re-route the video traffic over the LTE interface. The signaling message received from the EPG 105 is called a "Flow Offload Request (FOR). The FOR carries flow parameters and a nonce (N). However, at this stage, in systems not employing the inventive concepts of the present disclosure, only the BNG 120 would be aware of the fact that the NAS is not ILNP-enabled and, therefore, cannot process ILNP signaling messages. It follows that the EPG 105 would not be able to tunnel data packets sent from mobile device 135 over the RGW 115 LTE interface as these data packets would be sent to the BNG 120 and not directly to the NAS 110 (the same limitation applies to data packets sent from the NAS 110, i.e., they cannot be tunneled directly over the RGW 115 LTE interface to mobile device 135). In order to enable data path selection in this embodiment, additional parameters and signaling exchange are needed between different entities.

At block 810, a message that includes flow parameters is sent from the BNG to a SDN controller. Upon receiving the FOR message and being aware that the NAS 110 is not ILNP-enabled, the BNG 120 sends a request to the SDN controller 405, which carries the flow parameters as they are processed by the NAS 110. This means that the BNG 120 first updates the destination locator with the NAS 110 IPv6 address (assuming ports are the same). In addition to sending the request to the SDN controller 405, the BNG 120 sends a new signaling message to the EPG 105 at block 815. The signaling message sent to EPG 105 notifies the EPG about the NAS 110 IPv6 address (and, optionally, the locator used to communicate through the WLAN interface). This notification is done by sending an Internet Control Message Protocol version 6 (ICMPv6) message called a Destination Prefix Update (DPU), which carries the destination locator used by mobile device 135 and the NAS 110 IPv6 address.

At block 820, the BNG 120 receives an acknowledgement from the EPG 105. In one embodiment, the acknowledgement is a Destination Prefix ACK (DPA) message.

At block 825, a notification is received from the SDN controller. The notification informs the BNG that a configuration of a RGW to tunnel traffic over a LTE interface is complete.

At block 830, and acknowledgement message is sent to the EPG. The BNG 120 replies to the EPG 105 with an acknowledgement message, e.g., a Flow Offload ACK (FOA) message. The FOA message carries the same parameters as the FOR message and includes a nonce (N).

In one embodiment, the DPU message can be embedded in the FOA message. In this case, no further response should be expected from the EPG 105.

In one embodiment, if the FOR message cannot be completed, e.g., in case of a failure, a Flow Offload Denial (FOD) message should be sent by the BNG 120 to the EPG 105 since EPG 105 has to take appropriate actions depending on the success/failure of the request. Similarly, the FOD message carry the flow parameters and the nonce (N).

Figure 9:
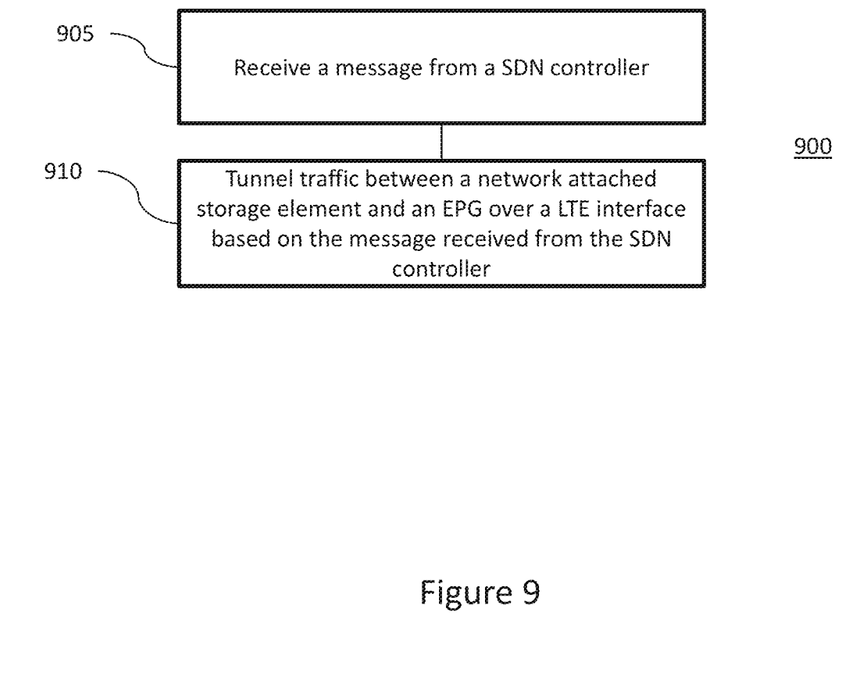
FIG. 9 illustrates a diagram of a method for enabling data path selection using a Residential Gateway, according to one embodiment.

FIG. 9 illustrates a diagram of a method for enabling data path selection, according to one embodiment. Method 900 begins at block 905. At block 905, a message is received from a SDN controller and a new entry is created in the routing table for RGW 115 with the necessary flow parameters. The received message is received using SDN protocols, e.g., ForCES. The RGW 115 is configured to tunnel data packets sent from NAS 110 over the LTE interface, i.e., using the LBC to communicate with EPG 105. Once configuration is complete, RGW 115 sends an acknowledgement message to the SDN controller 305 that notifies the SDN controller when configuration is complete. At block 910, traffic is tunneled between NAS 110 and EPG 105 over the LTE interface based on the message received from the SDN controller.

While the invention has been described in terms of several embodiments, those skilled in the art will recognize that the invention is not limited to the embodiments described. The description is thus to be regarded as illustrative instead of limiting.

What is claimed is:

1. A method performed by a gateway node in a Long Term Evolution (LTE) network for enabling data path selection in a virtual home gateway, which comprises:
   receiving, at the gateway node, from a mobile device served by the LTE network, Identifier Locator Network Protocol (ILNP) mobility signaling, the ILNP mobility signaling including a destination locator for a Border Network Gateway (BNG) in an Internet Protocol (IP) network that routes traffic to and from the mobile device via a Residential Gateway (RGW);
   sending, from the gateway node to the BNG, a signaling message in response to the received ILNP mobility signaling;
   receiving, at the gateway node, from the BNG, an acknowledgement message acknowledging the signaling message;
   after receiving the acknowledgement message, tunneling, over an LTE interface via the gateway node, traffic between the mobile device and the RGW.

2. The method of claim 1, wherein the signaling message includes a request to re-configure the RGW serving the destination locator.

3. The method of claim 2, wherein the signaling message comprises a Flow Offload Request (FOR).

4. The method of claim 3, which further comprises:
   receiving a Flow Offload Denial (FOD) from the BNG when the FOR cannot be completed.

5. The method of claim 4, wherein the FOD includes flow parameters and a nonce.

6. The method of claim 3, wherein the FOR includes flow parameters and a nonce.

7. The method of claim 6, wherein the flow parameters comprise at least one port number, at least one locator, and at least one tunnel parameter.

8. The method of claim 1, wherein the acknowledgement message from the BNG includes flow parameters and a nonce.

9. The method of claim 1, which further comprises:
   determining a mapping between a prefix of the LTE interface of the RGW and at least one home network locator for a user that is advertised by the BNG.

10. The method of claim 9, wherein an associated Software Defined Networking (SDN) controller is used to update a configuration of the RGW over the LTE interface.

11. The method of claim 1, which further comprises:
    receiving a signaling message from the BNG;
    storing, in a cache memory, in response to the signaling message from the BNG, a binding between a destination locator of the mobile device and an Internet Protocol version 6 (IPv6) address of a network attached storage element;
    sending an acknowledgement to the BNG.

12. The method of claim 11, wherein the signaling message from the BNG comprises a Destination Prefix Update (DPU).

13. The method of claim 11, wherein the acknowledgement sent to the BNG comprises a Destination Prefix Acknowledgement (DPA).

14. The method of claim 11, wherein parameters used to tunnel the traffic over the LTE interface are added to the stored binding.

15. The method of claim 14, wherein an ILNP-proxy entity is used to tunnel the traffic between the mobile device and the RGW.

16. A method performed by a Border Network Gateway (BNG) in an Internet Protocol (IP) network for enabling data path selection in a virtual home gateway, which comprises:
receiving, at the BNG, from an Evolved Packet Gateway (EPG) of a Long Term Evolution (LTE) network, a signaling message;
in response to receiving the signaling message, sending, from the BNG, to a Software Defined Networking (SDN) controller, a message that includes flow parameters for re-configuring a Residential Gateway (RGW) to flow traffic to the EPG from the BNG;
receiving, at the BNG, from the SDN controller, a notification that configuration of the RGW to tunnel, over an LTE interface via the EPG, traffic between the mobile device and the RGW is completed;
in response to receiving the notification, sending, from the BNG to the EPG, an acknowledgement message acknowledging the signaling message.

17. The method of claim 16, wherein the message sent to the SDN controller comprises a Flow Offload Request (FOR) message.

18. The method of claim 16, which further comprises:
running an Identifier Locator Network Protocol (ILNP) proxy entity;
sending a signaling message to the EPG; and
receiving an acknowledgement from the EPG.

19. The method of claim 18, wherein the message sent to the SDN controller comprises a request that carries flow parameters as processed by a network attached storage element associated with the RGW.

20. A method performed by a Residential Gateway (RGW) in an Internet Protocol (IP) network for enabling data path selection in a virtual home gateway, which comprises:
receiving, at the RGW, from a Software Defined Networking (SDN) controller, a message; and
after receiving the message, tunneling, over a Long Term Evolution (LTE) interface, traffic between a network attached storage (NAS) element and an Evolved Packet Gateway (EPG) of an LTE network based on the message received from the SDN controller.

21. An apparatus that enables data path selection in a virtual home gateway, comprising:
a gateway node in a Long Term Evolution (LTE) network configured to:
receive, from a mobile device served by the LTE network, Identifier Locator Network Protocol (ILNP) mobility signaling, the ILNP mobility signaling including a destination locator for a Border Network Gateway (BNG) in an Internet Protocol (IP) network that routes traffic to and from the mobile device via a Residential Gateway (RGW);
send, to the BNG, a signaling message in response to the received ILNP mobility signaling;
receive, from the BNG, an acknowledgement message acknowledging the signaling message;
after receiving the acknowledgement message, tunnel, over an LTE interface, traffic between the mobile device and the RGW.

22. The apparatus of claim 21, wherein the gateway node is further configured to:
receive a signaling message from the BNG;
store, in a cache memory, in response to the signaling message from the BNG, a binding between a destination locator of the mobile device and an Internet Protocol version 6 (IPv6) address of a network attached storage element;
send an acknowledgement to the BNG.

23. An apparatus that enables data path selection in a virtual home gateway, comprising:
a Border Network Gateway (BNG) in an Internet Protocol (IP) network configured to:
receive, from an Evolved Packet Gateway (EPG) of a Long Term Evolution (LTE) network, a signaling message;
in response to receiving the signaling message, send, to a Software Defined Networking (SDN) controller, a message that includes flow parameters for re-configuring a Residential Gateway (RGW) to flow traffic to the EPG from the BNG;
receive, from the SDN controller, a notification that configuration of the RGW to tunnel, over an LTE interface, traffic between the RGW and the EPG is completed;
in response to receiving the notification, send, to the EPG, an acknowledgement message acknowledging the signaling message.

24. The apparatus of claim 23, wherein the BNG is further configured to:
run an Identifier Locator Network Protocol (ILNP) proxy entity;
send a signaling message to the EPG; and
receive an acknowledgement from the EPG.

25. An apparatus enables data path selection in a virtual home gateway, comprising:
a residential gateway (RGW) in an Internet Protocol (IP) network configured to:
receive, from a Software Defined Networking (SDN) controller, a message; and
after receiving the message, tunnel, over a Long Term Evolution (LTE) interface, traffic between a network attached storage (NAS) element and an Evolved Packet Gateway (EPG) of an LTE network based on the message received from the SDN controller.

* * * * *